Sept. 12, 1944. J. M. LAWSON Re. 22,545

POWER TRANSMISSION MECHANISM

Original Filed Sept. 13, 1940 2 Sheets-Sheet 1

Inventor
Joseph M. Lawson
By Paul O. Parker
Attorney

Sept. 12, 1944. J. M. LAWSON Re. 22,545

POWER TRANSMISSION MECHANISM

Original Filed Sept. 13, 1940 2 Sheets-Sheet 2

Inventor
Joseph M. Lawson
By Paul O. Parker
Attorney

Reissued Sept. 12, 1944 Re. 22,545

UNITED STATES PATENT OFFICE 22,545

POWER TRANSMISSION MECHANISM

Joseph M. Lawson, Memphis, Tenn.

Original No. 2,294,356, dated August 25, 1942, Serial No. 356,709, September 13, 1940. Application for reissue August 23, 1943, Serial No. 499,661

18 Claims. (Cl. 74—259)

This invention relates to power transmission mechanisms and particularly to a power transmitting mechanism for transmitting power from a drive shaft or element to a driven shaft or element through interposed variably controlled transmission gearing.

The objects of the invention are:

1. To provide transmission mechanism embodying means of coupling two shafts for transmission of power from one to the other without the use of frictional surfaces.

2. To provide an overriding clutch mechanism by using two gear trains comprising or including a planetary system with one of said trains containing an irreversible worm (capable of being driven from one end of train only) and making use of angular or radial relation of gears in either train to select or direct which gear train shall do the driving.

3. To provide a clutching device driving through a spring coupling and a means for the driving shaft to override the driven shaft when the capacity of the spring coupling has been exceeded.

4. To limit and control the torque imparted to the driven shaft so that: (*a*) no undue strain will be forced on the driven unit by a sudden start or quick acceleration, and (*b*) the desired amount of power, and resulting speed, may be taken from the driving shaft when needed regardless of the power and speed of the driving shaft.

5. To provide a means of "escapement" or "overriding" when the power or speed of the driving shaft is in excess of the amount needed for the safe operation of the driven unit.

6. To provide a mechanical means of applying braking force or resistance to a rotating shaft by use of spring tension, and without use of frictional surfaces, and means for controlling or varying such resistance or braking force.

With these and other objects in view, the invention consists of the novel features of construction, combination and arrangement of parts, hereinafter fully described and claimed, and shown in the accompanying drawings, in which—

Figure 1:
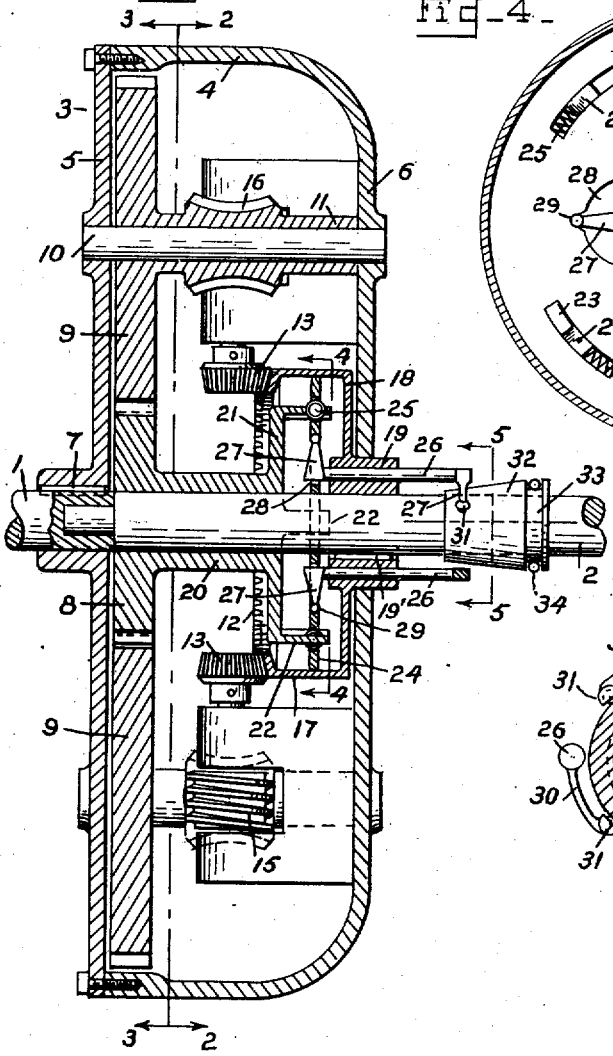
Fig. 1 is a central vertical longitudinal section through a transmission mechanism embodying my invention, taken on line 1—1 of Fig. 2.
Figure 4:
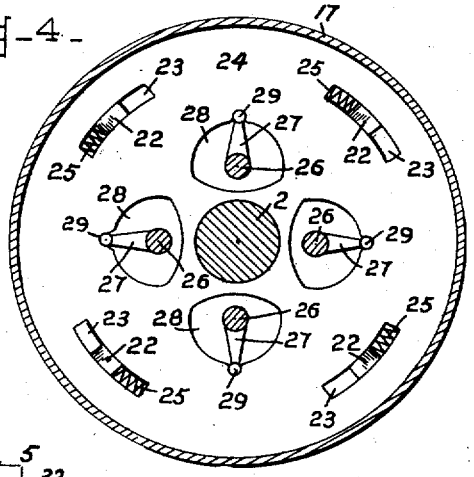
Figure 5:
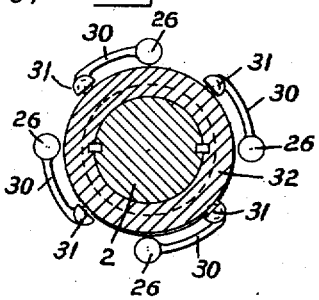
Figure 2:
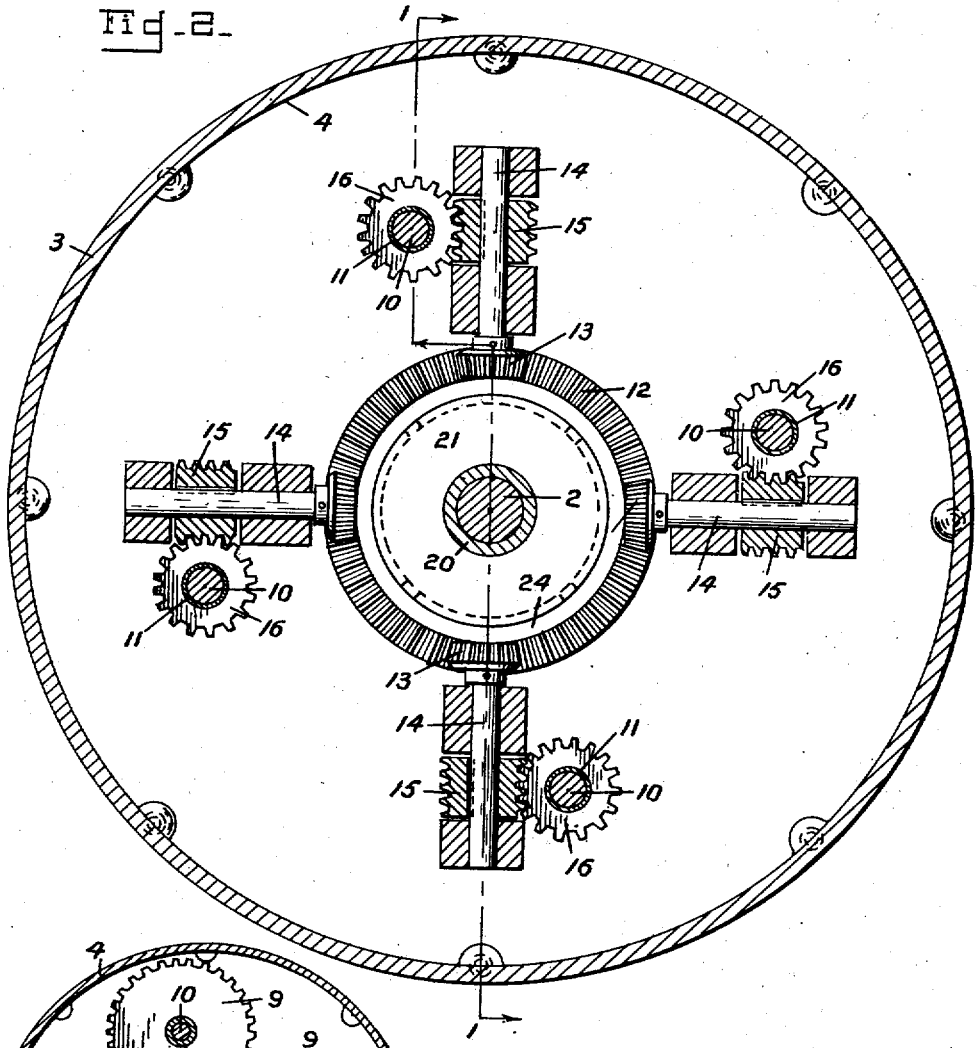
Fig. 2 is a vertical transverse section on line 2—2 of Fig. 1.
Figure 3:
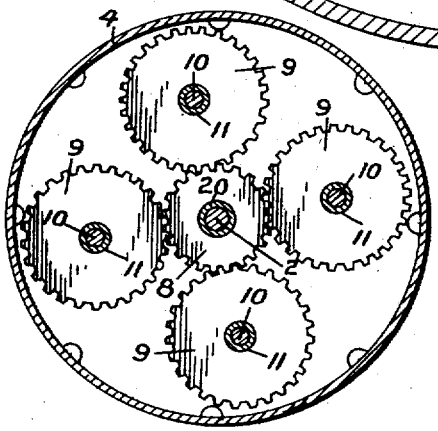

Figs. 3, 4 and 5 are detail sections taken, respectively, on lines 3—3, 4—4 and 5—5 of Fig. 1.

In the exemplified form of the invention herein shown, 1 is a driving shaft or element and 2 a driven shaft or element, which shafts are arranged in axial alinement and unconnected directly with each other, but preferably have their adjacent ends centered with relation to each other as shown.

A gear casing or housing 3, embodying an annular body wall 4 and front and rear walls 5 and 6, is keyed or otherwise fixed to one end of the shaft 1, as shown at 7, and encloses the adjacent end of the shaft 2 which is free from physical connection therewith. This casing encloses the transmission mechanism and may be oil tight so as to serve as a reservoir for oil to keep the transmission elements constantly lubricated.

The transmission mechanism comprises a set of spur toothed planetary gears consisting of a sun gear 8 journaled on the shaft 2 and a series of planetary gears 9 arranged equidistantly about said shaft and meshing with the sun gear 8. The gears 9 are rotatable on journals 10 extending between and supported by the walls 5 and 6 and are provided with sleeves 11 fixed thereto and rotatable therewith. The transmission mechanism also comprises a second set of planetary gears consisting of a beveled toothed sun gear 12 keyed or otherwise fixed to the shaft 2 to rotate therewith and meshing with the beveled pinions 13 of a series of worm gear units arranged equidistantly about the shaft 2. These units consist of shafts 14 arranged radially of or at right angles to the shaft 2 and on each of which is fixed a pinion 13 and an irreversible worm 15, which worms 15 mesh with worm gears 16 fixed to the sleeves 11 of the spur planetary gears 9 whereby the two planetary gear trains are operatively connected.

The sun gear 12 is in the form of a ring or rim flange fixed to the rear edge of an annular body 17 connected to an outer wall or disk 18 carried by a hub 19 keyed, as at 19′, to the shaft 2, said body and disk forming a casing, housing or chamber open at its rear side facing the sun gear 8.

Fixed to the sun gear 8 is a sleeve 20 which extends about the shaft 2 rearwardly into the casing formed by the gear 12. This sleeve carries within said casing a disk-like coupling member or head 21 provided with a series of rearwardly projecting arms or abutments 22 which project rearward through arcuate slots 23 in a cooperating coupling member 24. This member 24 consists of a floating plate or disk centrally apertured for the passage of the shaft about which it may be oscillated or turned in one direction or the other within the limit allowed by the slots 23 and the arms 22 by which latter it is solely supported. A coiled spring 25 is disposed in each slot 23 between one of the end walls of the slot and the associated arm or abutment 22 by which the coupling members 21 and 24 are elastically coupled for controlling actions whereby the angular or radial relation between the sun gears and the relationship of each sun gear to its coacting planetary gears may be changed to regulate the action of the gearing.

For the purpose of varying the tension and regulating the resistance of these springs to rotation of the member 24, and to variably adjust said member to vary the angular or radial relation between the sun gears and of each sun gear to its coacting planetary gears, an adjusting or controlling means is provided. This consists of rock shafts 26 journaled in and extending through the hub 19 of the sun gear 12, which shafts carry at their inner ends crank arms 27 fitting in slots 28 in the coupling disk 24 and having at their free ends rollers 29 engaging the outer contracted ends of the slots whereby when the arms 27 are rocked in one direction or the other from a neutral position and back again the disk 24 will be correspondingly oscillated or rocked. At the outer ends of the shafts 26 are rocker arms 30 having anti-friction bearing balls 31 at their free ends which engage the tapered surface of an adjusting cone 32. The cone 32 is feathered to slide upon and rotate with the shaft 2 and is adapted to be slidably adjusted outwardly and inwardly to shift the arms 30 to adjust the disk 24 to dispose it in neutral position or to vary the angular relationship between the sun gears and regulate the resistance of the springs to rotation of the sun gear 8. The cone 32 is annularly grooved as at 33 to receive the fork arms 34 of a suitable shifter or adjusting device which may in practice be manually or automatically operated. While this type of controlling means is disclosed as one type which may be practically used any other suitable or equivalent type may be employed.

The gear ratio of the train of gears including the bevel sun gear 12, pinion 13, worms 15 and worm gears 16 must be such that the final ratio between worm gears 16 and sun gear 12 equals the ratio between sun gear 8 and planet gears 9.

When the control arms 27 are in normal or neutral position the angular or radial relation of sun gears 8 and 12 is so fixed that the tooth pressure on both of said sun gears drive their respective planet gears together about their own axes, namely, the journals 10, or the sun gear 12 drives the planet gears through the irreversible drive worm and the sun gear will follow through. Under the above conditions the housing and planet gears will rotate about the sun gears and driven shaft while the latter remains idling or neutral.

When the control cone 32 is moved on shaft 2 towards the casing or housing, the angular or radial relation of the sun gears is changed so that tooth pressure is built up between sun gear 8 and planet gears 9 and no tooth pressure is exerted between sun gear 12 and pinions 13. The resistance of sun gear 8 tends to rotate the planet gears or journals 10 and causes planet worm gears 16 to lock against worms 15. It is understood that in this action worms 15 are not being rotated as there is no tooth pressure between sun gear 12 and pinions 13 and the pitch of the worms will not allow planet worm gears 16 to drive the worms 15. Therefore the planet gears will not rotate on their own axes and the entire unit, including the driven shaft 2, will rotate in a one to one ratio. When the mechanism is in neutral position, cone 32 is moved along the shaft 2 away from the wall of housing 3, allowing the arm 30 to lower, releasing tension on the spring 25. This allows the sun gear 8 to be free and unrestrained within the limits permitted by movement of the arms 22 in the slots 23, therefore, when the housing 3 is rotated around the shaft 2, when the latter is stationary or idling, the planet gear system is driven by the bevel sun gear 12. This will cause the planet gears to rotate on their own axis and walk around the sun gear and unit is in idling position.

When driving, the cone 32 is moved forward towards the oil housing. This rotates the disk 24 and this action through the spring 25 and the arm 22 causes the teeth of the sun gear 8 to fit tightly or build up tooth pressure against the gear 9. This causes an unloading or releasing of tooth pressure between the bevel sun gear 12 and the pinions 13. The tooth pressure between the sun gear 8 and the planet gears 9 attempts to rotate the planet gears on their own axis but since the tooth pressure between the bevel sun gear 12 and the pinions 13 has been unloaded the worm gear 15 does not rotate and the "irreversible pitch" does not permit the worm gear 15 to be driven by the worm gear 16. Therefore, the worm gear 16 locks against the worm gear 15 and the planet gear 9 is locked from rotating on its own axis and the sun gear 8 revolves with the housing 3, driving the driven shaft 2 through the arm 22, the spring 25, the disk 24, the arm 27, the shaft 26, seated in the hub 19, which is keyed to the shaft 2.

If, while in driving position, the shaft 2 is overloaded sufficiently to cause the springs 25 to close up and allow tooth pressure to build up between the bevel sun gear 12 and the pinions 13 and rotate worm 15, the housing will overrun the driven shaft 2. At the same time the action of the spring through the line of drive outlined above will continue to drive driven shaft 2 while it is being over-ridden. The amount of torque exerted on the driven shaft 2 before over-riding occurs is determined by the set of the cone 32.

The foregoing describes the unit in idling, driving and over-riding positions, respectively. The irreversible worm permits the planet system to be driven from one direction only (i. e., from bevel sun gear 12). When attempts are made to drive from other direction (sun gear 8) the planet system is locked on its own axis and the drive is direct.

Since the compression or distortion of the springs cannot exceed the clearance in the gear train, as the sun wheels must revolve together, no injury can be done to the spring coupling.

It will be seen that the escapement or overrunning begins when the tension of the springs has been overcome sufficiently to cause sun gear 12 to drive worms 15 and the torque delivered at the time this escapement or overrunning occurs is the maximum torque that can be delivered through the device. Therefore the torque is limited by the ability of the springs to overcome the resistance of the load.

Cooperating coupling 24 and its associated control mechanism is provided to change or adjust the ability of the springs to overcome the resistance of the load. Thus by movement of the control cone 32 laterally along shaft 2, by any manually or automatically adjusting device, the maximum limit of the torque transmitted can be increased or decreased.

From the above it is seen that no strain greater than the maximum torque limit for which the device is set can be forced upon the driven unit during sudden start or quick acceleration; furthermore, the speed—which is the result of torque operating against resistance—can be varied or controlled independently of the driven shaft and resistance of the driven unit by controlling the limit of torque output of the device as above described.

If the driven shaft 2 is secured so it cannot revolve the device will apply a braking force or resistance to the driving shaft. Constant resistance can be applied by setting the spring tension to produce the desired resistance. The resistance or braking may be varied by changing the spring tension by moving cone 32 inward and outward on shaft 2 or by the use of other means.

Obviously the invention may be used for driving gearing of all kinds where driving actions of the kind described are necessary or desirable. Among the many applications of this invention is in driving a supercharger for airplanes. At low ceiling the torque limit is set low and the heavy atmospheric condition and rapid build up of pressure in the manifold would drive the supercharger at a relatively low speed with the driving shaft overrunning. In quick acceleration for take offs or emergencies no undue strain would be forced on the step-up gears and the acceleration of the supercharger could be made to lag the engine acceleration sufficiently to protect said step-up gears.

For maximum ceiling the device is set for a one to one ratio and maximum speed needed for this ceiling should be considered in step-up gear ratio.

To suit all intermediate ceilings and varying conditions adjustment can be made manually or automatically to maintain correct manifold pressure.

What I claim is:

1. A power transmission mechanism comprising, several gear trains, each including a planetary system, one of said systems having an irreversible worm adapted to be driven from one end only, means changing the angular relation of the gears in either train to effect driving activity and including a floating element located between the trains and having resilient connections with one gear of one system, and means for varying the resiliency of said connections.

2. A power transmission mechanism comprising, several gear trains, each including a planetary system, one of said systems having an irreversible worm adapted to be driven from one end only, means changing the angular relation of the gears in either train to effect driving activity and including a floating element located between the trains and having resilient connections with one gear of one train, means for varying the resiliency of said connections, and driving and driven elements associated with the respective trains.

3. In a power transmission mechanism, separated trains of gears, each including a planetary system having a sun gear, an irreversible worm connecting the trains and driven at one end only, and means for controlling the angular relation of gears of either system on either side of the irreversible worm to determine which side of said worm is to be driven.

4. In a power transmission mechanism, separated gear trains, each including a planetary system having a sun gear, an irreversible gear driven by one of said sun gears, means for controlling the angular relations of gears of either system on either side of the irreversible gear to determine which side of the latter is to be driven, and a resilient coupling included in said means.

5. In a power transmission mechanism, separated gear trains, each including a planetary system having a sun gear, and an irreversible gear driven by one of said sun gears, means for controlling the angular relations of gears of either system on either side of the irreversible gear to determine which side of the latter is to be driven, a resilient coupling included in said means and having connections with the systems through their sun gears, and means for regulating said coupling.

6. A power transmission mechanism including a driving shaft, a carrier mounted on and driven by said shaft, a driven shaft alined with said driving shaft, a first sun gear secured on said driven shaft, a second sun gear mounted to float on one of said shafts, a first and second gear train journalled by said carrier and meshing respectively with said first and said second sun gears, said first train including a worm gear, and said second train, a worm, meshing with said gear, said worm and said gear having respectively rotative idling, and locking driving relation the one with the other, and resilient means interposed in driving relation between said sun gears, normally maintaining rotative idling relation between said worm and gear and responsive to driving torque to establish driving relation therebetween.

7. A power transmission mechanism including a driving shaft, a carrier mounted on and driven by said shaft, a driven shaft alined with said driving shaft, a first sun gear secured on said driven shaft, a second sun gear mounted to idle on one of said shafts, several gear trains journalled by said carrier, and meshing respectively with said first and said second sun gears, each said train including a worm gear, and, a worm, meshing with said gear, said worm and said gear having respectively rotative idling and non-rotative locking relation the one to the other, resilient torque responsive means interposed in driving relation between said sun gears, and means for independently varying the tension of said resilient means.

8. A power transmission mechanism including a driving shaft, a carrier mounted on and driven by said shaft, a driven shaft alined with said driving shaft, a first sun gear secured on said driven shaft, a second sun gear mounted to idle on one of said shafts, several gear trains, journalled by said carrier and meshing respectively with said first and said second sun gears, each said train including a worm gear, and, a worm, meshing with said worm gear, each said worm and meshing worm gear having respectively rotative and non-rotative locking relation the one with the other; and means, for including resilient means interposed in driving relation between said sun gears for rotatively shifting said gears, the one with respect to the other.

9. A power transmission mechanism including a driving shaft, a carrier mounted on and driven by said shaft, a driven shaft alined with said driving shaft, a first sun gear secured on said driven shaft, a second sun gear mounted to idle on one of said shafts, several gear trains journalled by said carrier and meshing respectively with said first and said second sun gears, each said train including a worm gear, and, a worm, meshing with its respective said worm gear, each said worm and meshing worm gear having respectively rotative, and non-rotative locking relation the one to the other; means for coupling said sun gears, including resilient means interposed in driving relation therebetween, and means for varying the tension of said resilient means.

10. A power transmission including alined driving and driven shafts, carrier means secured to said driving shaft, sun gears, one secured on said driven shaft and one floating on one of said shafts, gear trains journalled by said carrier means and meshing at their opposite ends with said sun gears, said trains each respectively including a worm and meshing gear respectively effecting rotative and locking action the one on the other, means interposed between said sun gears to effect rotative advancement of the one relatively to the other whereby to shift driving contact of said sun gears with said gear trains to and from the rotative worm ends thereof, from and to the locking gear ends thereof, and springs respectively interposed in driving relation between said floating gear and said driven shaft.

11. A power transmission including alined driving and driven shafts, carrier means secured to said driving shaft, sun gears, one secured on said driven shaft and one floating on one of said shafts, gear trains journalled by said carrier means and meshing at their opposite ends with said sun gears, said trains each respectively including a worm and meshing gear respectively effecting rotative and locking action the one on the other, means interposed between said sun gears to effect rotative advancement of the one relatively to the other whereby to shift driving contact of said sun gears with said gear trains to and from the rotative worm ends thereof, from and to the locking gear ends thereof, and springs respectively interposed in driving relation between said gears meshing with said worms, and said driven shaft.

12. A power transmission including alined driving and driven shafts, carrier means secured to said driving shaft, sun gears, one secured on said driven shaft and one floating on one of said shafts, gear trains journalled by said carrier and meshing at their opposite ends with said sun gears, said trains each respectively including meshing gears inherently having rotative and locking action the one on the other, means interposed between said sun gears to effect rotative advancement of the one relatively to the other whereby to shift driving contact of said sun gears with said gear trains to and from rotative relation therewith from and to locking relation relative therewith, and springs interposed in driving relation between said floating sun gear and said advancing means.

13. A power transmission including alined driving and driven shafts, carrier means secured to said driving shaft, sun gears, one secured on said driven shaft and one floating on one of said shafts, gear trains journalled by said carrier and meshing at their opposite ends with said sun gears, said trains each respectively including a worm and meshing gear inherently effecting rotative and locking action the one on the other, and means interposed between said sun gears to effect rotative advancement of the one relatively to the other whereby to shift driving contact of said sun gears with said gear trains to and from the worm ends thereof, from and to the gear ends thereof.

14. A power transmission including alined driving and driven shafts, carrier means secured to said driving shaft, sun gears, one secured on said driven shaft and one floating on one of said shafts, gear trains journalled by said carrier and meshing at their opposite ends with said sun gears, said trains each respectively including meshing gears inherently having rotative and locking action the one on the other, and means interposed between said sun gears to effect rotative advancement of the one relatively to the other whereby to shift driving contact of said gears with said gear trains each respectively to and from rotative relation therewith, from and to locking relation therewith.

15. A power transmission including alined driving and driven shafts, carrier means secured on said driving shaft, sun gears, one secured on said driven shaft and one floating on one of said shafts, gear trains journalled in said carrier meshing at their opposite ends with said sun gears, said trains each respectively including meshing gears inherently having rotative and locking action the one on the other, means interposed between said sun gears to effect rotative advancement of the one relatively to the other whereby to shift driving contact of said sun gears with said gear trains to and from rotative relation therewith, from and to locking relation therewith, and springs interposed in driving relation between said locking action gears and said driven shaft.

16. A power transmission including alined driving and driven shafts, sun gears, one secured on said driven shaft and one floating on one of said shafts, gear trains meshing at their opposite ends with said sun gears, said trains each respectively including a worm and meshing gear respectively effecting rotative and locking action the one on the other, means, secured on said driving shaft, journalling said gear trains, means interposed between said sun gears to effect rotative advancement of the one relatively to the other whereby to shift driving contact of said sun gears with said gear trains to and from the worm ends thereof from and to the gear ends thereof, and springs respectively interposed in driving relation between said floating sun gear and said advancing means.

17. A power transmission including alined driving and driven shafts, sun gears, one secured on said driven shaft and one floating on one of said shafts, gear trains meshing at their opposite ends with said sun gears, said trains each respectively including a worm and meshing gear respectively effecting rotative and locking action the one on the other, means, secured on said driving shaft, journalling said gear trains, means interposed between said sun gears to effect rotative advancement of the one relatively to the other whereby to shift driving contact of said gear trains, each respectively, to and from the worm ends thereof, from and to the locking gear ends thereof.

18. A power transmission including driving and driven means, sun gears one secured to said driven means, and one journalled by one of said means, gear trains meshing at their opposite ends with said sun gears, said trains each respectively including meshing gears respectively effecting rotative and locking action the one on the other, means secured to said driving means journalling said trains, means interposed between said sun gears to effect rotative advancement of the one relatively to the other whereby to shift driving contact with said gear trains, each respectively, to and from the rotative gear ends thereof, from and to the locking gear ends thereof.

JOSEPH M. LAWSON.